UNITED STATES PATENT OFFICE.

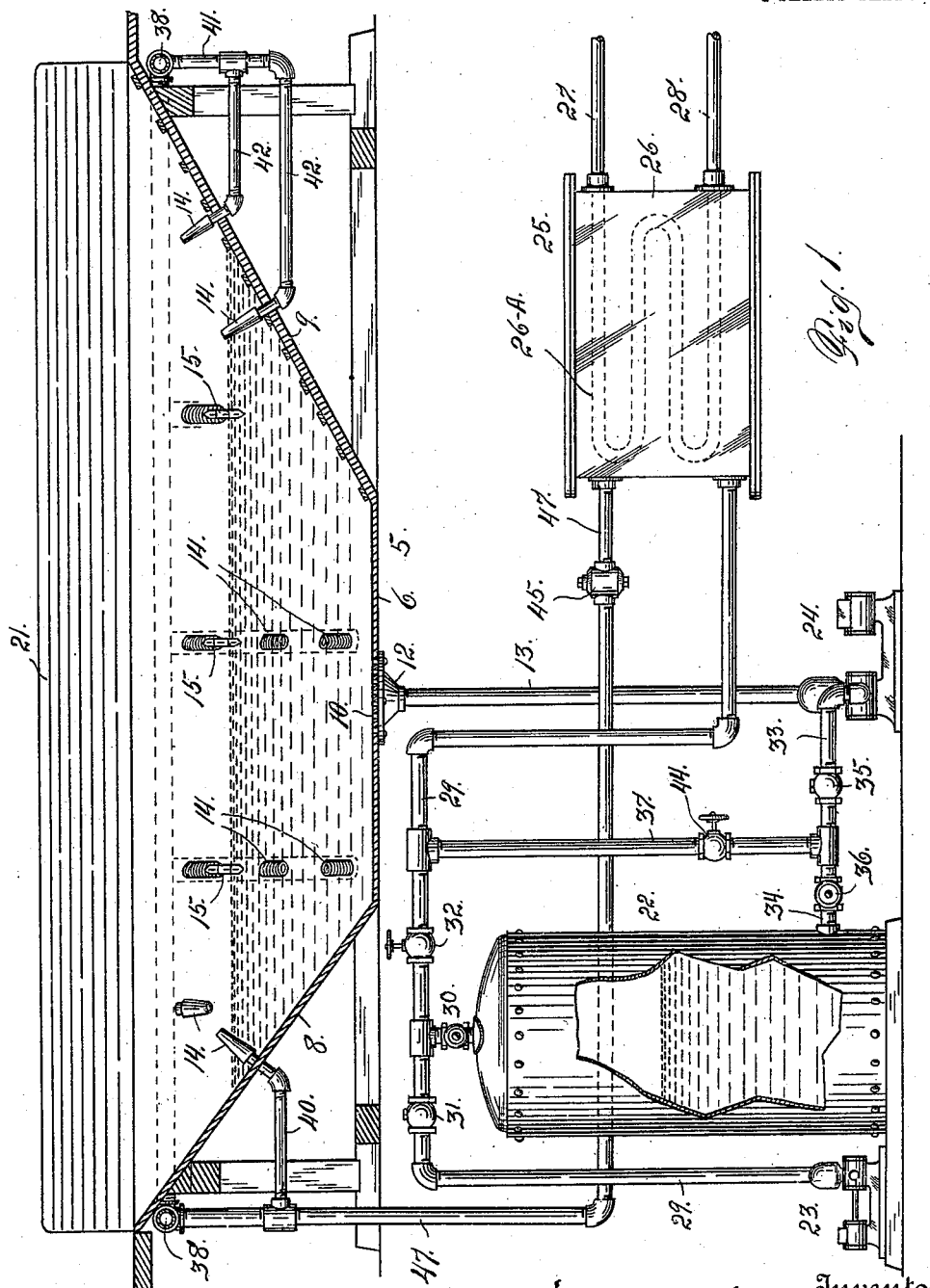

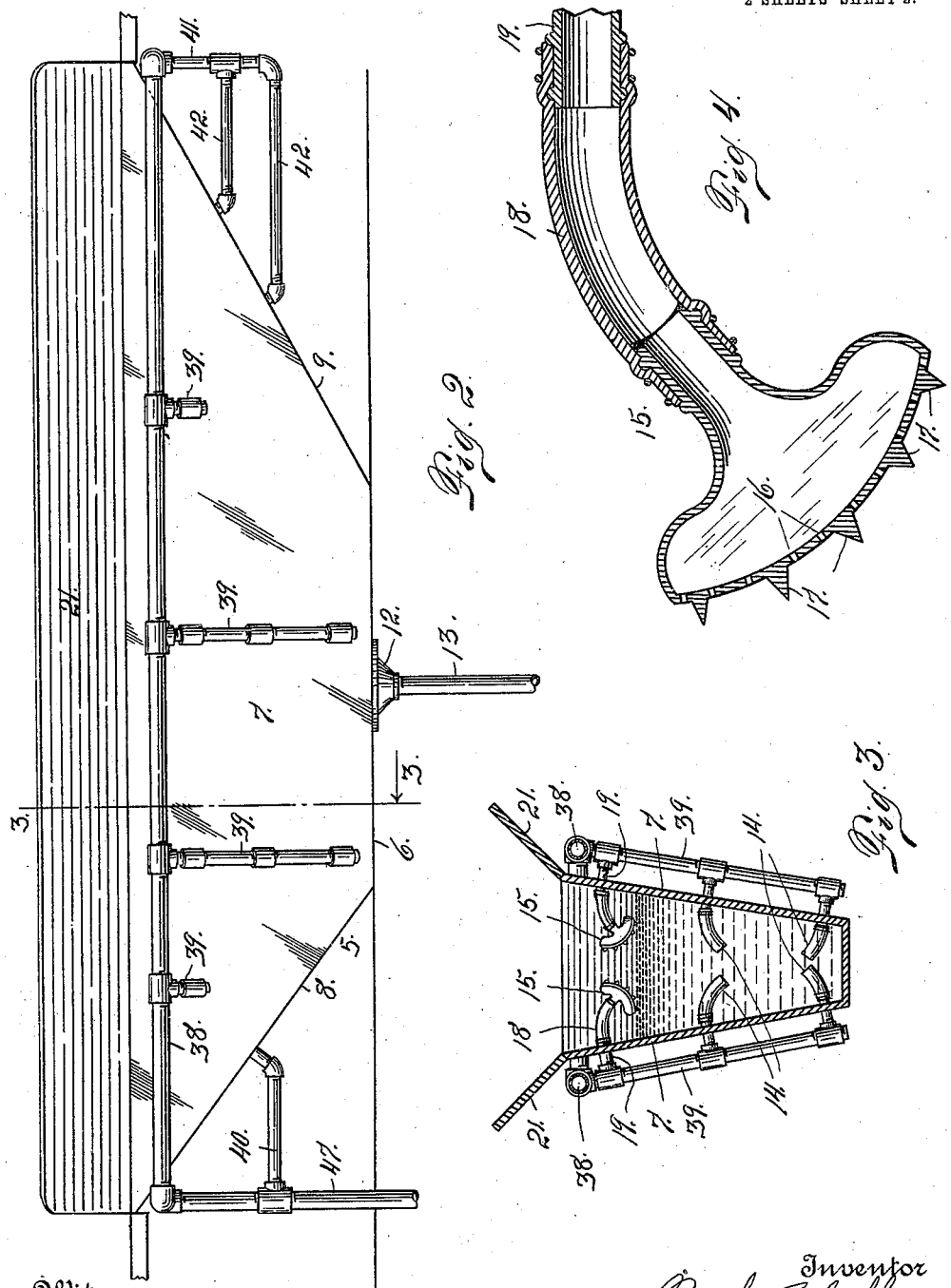

FRANK C. GOFF, OF DENVER, COLORADO.

ANIMAL-TREATING APPARATUS.

983,820. Specification of Letters Patent. Patented Feb. 7, 1911.

Application filed April 5, 1909. Serial No. 488,019.

*To all whom it may concern:*

Be it known that I, FRANK C. GOFF, a citizen of the United States, residing in the city and county of Denver and State of Colorado, have invented certain new and useful Improvements in Animal - Treating Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in apparatus for treating animals for the purpose of killing or destroying the various disease germs as well as different varieties of vermin with which they are afflicted, the said germs and vermin finding lodgment in the hair or wool of the animal in a manner well understood.

While my improved apparatus is adapted for treating animals of any kind, it is especially well adapted for treating sheep. Since the latter are clothed with a fleece of wool of more or less thickness, there is greater difficulty in properly treating them for the purpose aforesaid, than any other class of animals. My improved apparatus is, however, specially devised with this end in view and comprises generally speaking a tank, an entrance, an exit, spraying devices and means for delivering fluid to the said devices.

Some of the spraying devices are flexible and at various points extend a considerable distance into the tank. They are located and spaced in a manner to form a line or lines of discharge ports surrounding the space through which the animal passes. The nozzles being flexible, they ride or press against the animal when passing through the tank, thus bringing the discharge ports in contact with the wool or skin. The other nozzles are placed flush with the inside walls of the tank and discharge the fluid upon the animal.

After shearing sheep they can be treated by passing them through the tank, and subjecting them to the sprays only, the surplus liquid being collected by the walls of the tank and returned to the spraying nozzles. When, however, the animal has a considerable growth of wool, the treatment consists in filling the tank with a dipping liquid into which the animal is plunged with sufficient force to completely submerge it. In the operation the animal passes between the flexible nozzles which ride or press against the wool. The fluid discharged from these nozzles moves and works the wool in a manner to break it open and allow the liquid forming the bath and surrounding the animal to reach all parts of the wool and skin. This operation is materially aided by the discharge from the nozzles located on the tank walls and bottom, in the entrance or chute and in the exit passage. As the force of these jets keeps the bath liquid in constant agitation, as the liquid surrounding the animal is agitated as it passes through the tank, the wool is moved and broken open, whereby the liquid is forced into contact with all parts of the wool and skin.

Having briefly outlined my improved construction, I will proceed to describe the same in detail, reference being made to the accompanying drawing in which is illustrated an embodiment thereof.

In the drawing, Figure 1 is a vertical section taken through the tank of my improved apparatus, the other mechanism except the pressure tank being shown in elevation. Fig. 2 is a side elevation of the tank, the pipe connections being partly broken away. Fig. 3 is a cross section taken through the tank on the line 3—3, Fig. 2. Fig. 4 is a sectional detail view of one of the spray nozzles shown on a larger scale.

The same reference characters indicate the same parts in all the views.

Let the numeral 5 designate the tank which is shown in the drawing as a flat bottom 6, sloping sides 7 and inclined ends 8 and 9. The bottom of this tank is provided with a perforated portion 10 centrally located and surrounded by a flaring outlet 12 connected with a pipe 13 for delivering the liquid to the pump 24. The inclined ends as well as the side walls of the tank are equipped with nozzles 14, which may be located either wholly or partially below the level of the liquid. The side walls of the tank are also provided with nozzles 15 of peculiar construction, their discharge extremities being perforated as shown at 16 and provided with teeth or projections 17 adapted to enter the wool of the sheep somewhat in the manner of a comb, whereby the wool is opened to permit the fluid to reach every part thereof and come in direct contact with the skin. These nozzles are connected with a flexible member 18 interposed between the nozzle proper and the rigid pipe 19 to which they are attached. The nozzles 14 while of somewhat different construction, are also provided with flexible necks to allow the nozzle proper a suitable degree of movement, whereby the nozzles while yielding readily to prevent injury to the animal, are at the same time sufficiently rigid to dig into the wool of the sheep in such a manner as to cause the liquid to reach the skin and thoroughly saturate the entire fleece.

Above the body of the tank, the latter is provided with outwardly flared liquid collecting walls 21, to collect the splash that otherwise might pass beyond the tank. These walls are adapted to return the liquid as will be readily understood.

In addition to this combined dipping and spraying tank, I have illustrated a pressure storage tank 22, an air pump 23, a liquid pump 24 and a heater 25. This heater consists of a jacket 26 containing a steam pipe coil 26$^A$ so arranged therein as to cause the steam to travel a sufficient distance for suitably heating or warming the contents of the jacket. The steam pipe within the jacket is connected at its opposite extremities with inlet and exit pipes 27 and 28.

The pipe connections will now be described. From the air pump the pipe 29, leads upwardly and communicates with the top of the tank 22 by a valve controlled branch 30. Between the pump and the tank is a check valve 31 to prevent return pressure. Beyond the tank or on the opposite side of the inlet 30 from the check valve is located a cut off valve 32. From the liquid pump 24 leads a pipe 33 which communicates with the lower part of the tank at 34. The pipe 33 contains a check valve 35 and a cut off valve 36. Between the valves 35 and 36 a pipe 37 extends upwardly and communicates with the pipe 29 beyond the valve 32. The pipe 29 communicates with the interior of the heater 25. From this heater leads a pipe 47 to a sort of bustle pipe 38 extending entirely around the tank 5 and from which lead branch pipes 39, to the various nozzles 14 and 15 mounted upon the sides of the tank. From the pipe 47 at one end of the tank, lead branch pipes 40 (one only being shown), to the various nozzles 14 at the front end of the tank or that where the animals enter. At the opposite end of the tank a pipe 41 leads downwardly from the bustle pipe 38 and from this depending pipe lead branch pipes 42 which communicate with the nozzles 14 at the exit end of the tank.

When the apparatus is in use, the animals enter the extremity 8 of the tank and as they pass therethrough and out at the opposite end they are subjected to the action of the various nozzles 14 and 15 as heretofore outlined. In the actual operation of the apparatus, the pressure tank 22 may be first charged with a liquid from the pump 24. In this event, a valve 44 in the pipe 37 should be closed, while the valve 36 in the pipe 33 is left open. After a suitable quantity of liquid has been pumped into the tank 22, the valve 36 may be closed and air pumped into the top of the tank from the pump 23, through the pipe 29 and the valve controlled branch pipe 30, the valve in that event being open and the valve 32 in the pipe 29 being closed. After the water within the tank has been subjected to the necessary pressure, the pumps may be stopped, and the valves 36 and 44 opened. In this event, the liquid under pressure of the air in the tank 22 will be forced out of the tank up through the pipe 37 into the pipe 29 and thence into the heater 25 and thence out of the heater through the pipe 47 whence it passes to the nozzles of the treatment tank in the manner heretofore explained.

Attention is called to the fact that the pipe 47 is equipped with a pressure regulating valve 15 by means of which the pressure to which the liquid is subjected within the tank 22, may be reduced before entering the treatment tank, as low as desired or as may be required for the proper treatment of the animals.

From what has been already explained, it will be understood that both liquid and air may be pumped into the pressure tank and supplied to the nozzles, mixed in suitable quantities by regulating the valves on the supply lines. Liquid only may be used by pumping direct to the nozzles or by pumping into the tank against the air in the tank which as the pressure increases will compress and hold the liquid under pressure, and when the valve on the liquid feed line to the nozzles is opened, the air will expand forcing the liquid to the nozzles until the pressure drops to a degree inadequate for the work. The liquid may again be pumped into the pressure tank and the treating work continued. When operated in this manner, the pressure reducing valve 45 is an important factor as the liquid can be pumped into the pressure tank to a high pressure, say a hundred and fifty pounds and delivered at the nozzles at a low pressure, say five pounds.

The apparatus can be used with the pressure tank combined by operating the pump intermittently, thus storing the pressure.

Having thus described my invention, what I claim is:

1. In apparatus for the treatment of animals, the combination with a tank provided with an entrance and an exit for the animals, and a plurality of devices arranged to engage the coat of the animals and cause currents of fluid to be directed against all portions of the coat in the direction of the travel of the animals through the tank.

2. In apparatus for the treatment of animals, the combination of a liquid containing tank provided with an entrance and an exit for the animals, and a plurality of devices arranged to direct currents of fluid against all portions of the coat of the animals, the said currents flowing in the direction of the animal's travel, whereby the coat is parted to allow the liquid to enter and engage the skin of the animals while submerged in the liquid of the tank.

3. In apparatus for the treatment of animals, the combination of a liquid containing tank provided with an entrance and an exit for the animals, and a plurality of fluid delivering devices arranged and spaced to correspond approximately to the size of a single animal, the said devices being adapted to engage the coat of the animal and arranged to direct currents of fluid against all portions of the animal, the currents having a direction approximately parallel with the direction of the animal's travel, whereby the coat is parted to permit the liquid to reach the skin and all parts of the coat.

4. Apparatus for the treatment of animals, comprising a liquid containing tank provided with fluid delivery nozzles located below the level of the liquid and adapted to direct currents of liquid against the coat of the animal in a direction approximately parallel with the travel of the animal through the tank, substantially as described.

5. Apparatus for the treatment of animals, comprising a liquid containing tank, a plurality of flexible devices arranged to engage or rub against the animal while passing through the tank, the said devices consisting of fluid delivery nozzles located below the level of the liquid in the tank whereby currents of liquid are directed against the coat of the animal in the direction of the travel of the animal through the tank, thereby parting or opening the coat, for the purpose set forth.

6. Apparatus for the treatment of animals, comprising a plurality of flexible devices, a liquid containing tank in which said devices are located below the level of the liquid and consisting of fluid delivery nozzles arranged to conform to the general shape of the body of the animal and rub against the latter when passing the said devices, whereby the discharge jets of fluid are delivered in the direction of the travel of the animal through the tank causing currents of liquid to act in the said direction and serving to push the coat of the animal in one direction while the rubbing of the nozzles pushes the coat in the opposite direction, thus opening up the coat to allow the liquid to enter, for the purpose set forth.

7. In apparatus for the treatment of animals, the combination of a liquid containing tank open at the top for the entrance and exit of the animals, and means adapted to engage the coat of the animal for causing currents of liquid to strike the coat below the level of the liquid in the tank, the said currents moving in a direction approximately parallel with the travel of the animals through the tank, for the purpose set forth.

8. An animal treating apparatus, including a liquid containing tank, and means encircling the animal and adapted to engage the coat for causing the liquid surrounding the animal to be formed into currents which act upon the coat of the animal in a direction approximately parallel with the direction of the animal's travel through the tank, substantially as described.

9. In a device for treating animals, the combination with a trough for holding liquid, of liquid agitating means located above the bottom of the trough and comprising flexible delivery nozzles adapted to come in direct contact with the coat of the animal, whereby the discharge extremities of the nozzles are bent in the direction of the animal's travel causing the issue of fluid therefrom to set up liquid currents which strike the coat of the animal in the direction of its travel through the trough and open up the coat for the entrance of liquid, substantially as described.

10. In a device for treating animals, the combination of a liquid containing tank, agitating means located below the level of the liquid in the tank, comprising flexible fluid delivery nozzles adapted to come in direct contact with the coat of the animal while the latter is traveling through the tank, whereby the fluid jets issuing from the nozzle are caused to move in a direction approximately parallel with the travel of the animal through the tank causing the liquid currents to strike against the coat of the animal and open up the latter, for the purpose set forth.

11. In a device for the treatment of animals, the combination with a liquid containing tank, of means adapted to engage the coat of the animal for directing currents of liquid thereagainst below the level of the liquid in the tank and in a direction approximately parallel with the travel of the animal through the tank, substantially as described.

12. In an animal treating apparatus, the combination with a liquid-containing tank, of a flexible treating means located below the level of the liquid in the tank and arranged to automatically engage the animal while passing the said means for causing currents of liquid to strike the animal in a direction approximately parallel to the travel of the animal while passing through the tank.

13. In an animal treating apparatus, the combination of a liquid containing tank, and means located below the level of the liquid in the tank and adapted to engage the coat of the animal for discharging fluid into the said liquid and causing currents of liquid to strike the coat in a direction approximately parallel with the travel of the animal through the tank, for the purpose set forth.

14. In an animal treating apparatus, the combination of a liquid containing tank, and means located below the liquid level of the tank for discharging fluid jets under pressure into the liquid of the tank in a direction approximately parallel with the travel of the liquid through the tank, the said means engaging the coat of the animal while traveling through the tank.

15. An animal treating apparatus, including a liquid containing trough, and flexible fluid delivery devices located below the level of the liquid in the tank and adapted to come in direct contact with the animal while traveling through the tank, whereby the discharge extremities of the flexible devices are directed in the direction of the animal's travel through the tank, substantially as described.

16. An apparatus for the treatment of animals, including a liquid containing tank, agitating devices located below the level of the liquid in the tank and arranged to deliver fluid jets into the liquid in a direction approximately parallel with the travel of the animals through the tank, supply conduits in communication with the agitating devices and provided with pressure reducing valves, a pressure storage tank, and means for collecting the surplus liquid and returning the same to the pressure storage tank, substantially as described.

In testimony whereof I affix my signature in presence of two witnesses.

FRANK C. GOFF.

Witnesses:
 JESSIE HOBART,
 A. EBERT O'BRIEN.